United States Patent [19]

Morgan

[11] Patent Number: 4,495,857

[45] Date of Patent: Jan. 29, 1985

[54] LABYRINTH VENTILATOR

[75] Inventor: Paul E. Morgan, Bridgewater, N.J.

[73] Assignee: CTI International Inc., White Plains, N.Y.

[21] Appl. No.: 602,913

[22] Filed: Apr. 23, 1984

Related U.S. Application Data

[63] Continuation-in-part of Ser. No. 286,854, Jul. 27, 1981, abandoned.

[51] Int. Cl.³ .............................................. B60H 1/24
[52] U.S. Cl. ......................................... 98/6; 220/1.5
[58] Field of Search .................... 98/2.18, 6, 8, 13, 18, 98/19, 25, 32, 35, 42 R, 52; 220/1.5, 374

[56] References Cited

U.S. PATENT DOCUMENTS

| | | | |
|---|---|---|---|
| 657,743 | 9/1900 | Miller | 98/8 |
| 2,665,625 | 1/1954 | Woodhams | 98/19 |
| 2,885,941 | 5/1959 | Allen | 98/18 X |
| 3,696,729 | 10/1972 | Chabala et al. | 98/32 X |
| 4,169,407 | 10/1979 | Dorpmond | 98/18 X |

FOREIGN PATENT DOCUMENTS 2938286  5/1981  Fed. Rep. of Germany .......... 98/18

OTHER PUBLICATIONS

*CTI Technical Report* CTI World Headquarters, 445 Hamilton Ave., White Plains, New York, 10601, May 1980, p. C28.

*Primary Examiner*—Harold Joyce

[57] ABSTRACT

A labyrinth ventilator is formed of a unitary structure including a housing formed of a front wall and perimetric walls, the back of the housing being open for communication with an air breather opening in a sidewall of a container. Air inlet apertures are located in the perimetric wall at the bottom of the housing. A set of transverse vanes, which serve as baffles to the flow of air, are positioned in alternating fashion along the interior of the housing to provide for a sinuous passage for the flow of air. A seal is secured within a channel disposed in the top and side portions of the rear edge of the housing for excluding rain at the junction between the ventilator and a container sidewall.

11 Claims, 9 Drawing Figures

LABYRINTH VENTILATOR

This application is a continuation-in-part of a United States patent application entitled "Labyrinth Ventilator" having a Ser. No. 286,854 and a filing date of July 27, 1981 now abandoned.

BACKGROUND OF THE INVENTION

This invention relates to ventilators for installation on outside walls of cargo containers and, more particularly, to ventilators of unitary construction which are readily installable on marine cargo containers and are highly serviceable thereon.

Cargo containers are constructed of rigid walls and may include additional struts for buttressing the strength of the container for holding securely a variety of items of differing sizes and weights during transportation in or on a vehicle such as a ship, train, or airplane. Of particular interest are marine cargo containers which may be transported on open decks of ships and, hence, are subjected to extremes in weather conditions including large changes in temperature and humidity as well as wind and rain.

It is common practice to provide such containers with ventilation which permits flow of air from outside into the container and visa versa. Such ventilation protects contents of the containers from condensation of water vapor in the air, and also protects the contents from excessively high solar heating by offering a measure of cooling.

Typically, such a ventilator comprises an opening in an outer wall of the container and some form of outer housing with apertures therein for admission of air, the housing being configured with baffles to deflect wind forces in a rainstorm to prevent wetting of the contents of the container.

A problem arises in construction of these ventilators in that the sidewall of the container is constructed with various ribs and baffles protruding therefrom to become part of the ventilator. The housing, which may also include a baffle, is then secured to the container wall such that the two baffles are positioned relative to each other to provide a sinuous path for air flow from apertures in the housing to the opening in the container wall.

The sinuous path aids in deflecting the rain and wind from the interior of the container. Typically the apertures are disposed on a lower wall of the housing with the sinuous path extending in a generally upward direction.

This form of construction is disadvantageous in that the construction of the ventilator is unduly complicated. The aforementioned adaptation of the container wall to include specific components of the ventilator complicates both the fabrication of the ventilator and that of the container. Since containers generally are formed of steel plates, the foregoing construction requires formation of the ventilator elements by steel forming techniques which may include pressing, riveting, and welding. In addition, the ventilator may have to be disassembled periodically to inspect for frost and corrosion, which corrosion would necessitate replacement of the entire ventilator. And, as a further disadvantage, co-ordination is required by the manufacturer of the container and the manufacturer of the remaining portions of the ventilator, to provide precise mating of the various components thereof. Also the construction of the housing and any baffles and supporting structures therein can introduce complex assembly procedures when such components are to be secured in position by welding or riveting.

SUMMARY OF THE INVENTION

The foregoing problems are overcome and other advantages are provided by a ventilator constructed with a unitary form which, in accordance with the invention, can be molded in one piece, and includes all necessary baffles for providing the sinuous air path. Thereby, the container wall can be constructed with a smooth outer surface that is free of any protruding components of the ventilator. The container wall need be provided only with an opening for communication of air, and a screw hole for reception of a mounting bolt. Thereby, the ventilator of the invention can be attached readily to a cargo container, without the requirement of any special outer physical structures on the container wall, and without the necessity of any complex manufacturing steps to be utilized in the fabrication of the ventilator housing and the baffles therein.

The ventilator may be formed of a rigid moldable material such as polymeric materials including epoxy resins, polyurethane, and polyacrylics. The housing includes a front wall with a perimetric wall assembly comprising smaller walls extending from the perimeter. The smaller walls include a top wall, a bottom wall, and two sidewalls which ae set back from a rear edge of the housing to provide for an encircling flange which facilitates the mounting of the ventilator upon a container wall. In one embodiment of the invention, recesses are located within the perimetric walls at the encircling rear flange to provide access for mounting elements such as bolts. The bottom wall includes apertures for the admission of air.

In accordance with a feature of the invention, a plurality of baffles extend horizontally across the interior of the housing from one sidewall to the other sidewall. The baffles extend in differing amounts from the front wall towards the rear flange such that one of the baffles extends only part way to the rear flange and another of the baffles extends all the way to the rear flange. The baffle which extends all the way to the rear flange is provided with one or more openings adjacent the front wall to provide a sinuous path for the flow of air between the apertured bottom wall and an opening in the container wall.

As a further feature of the invention, the rear encircling flange includes a channel opening towards the rear, for mounting a water tight barrier along the top and sides of the rear flange. This barrier, which may be fabricated of a flexible plastic, tubing, or gasket, conforms to the surface of the container wall and thereby insures a water tight seal between the ventilator and the container along the sides and the top of the ventilator.

BRIEF DESCRIPTION OF THE DRAWING

The aforementioned aspects and other features of the invention are explained in the following description taken in connection with the accompanying drawing wherein.

DETAILED DESCRIPTION

Figure 1:
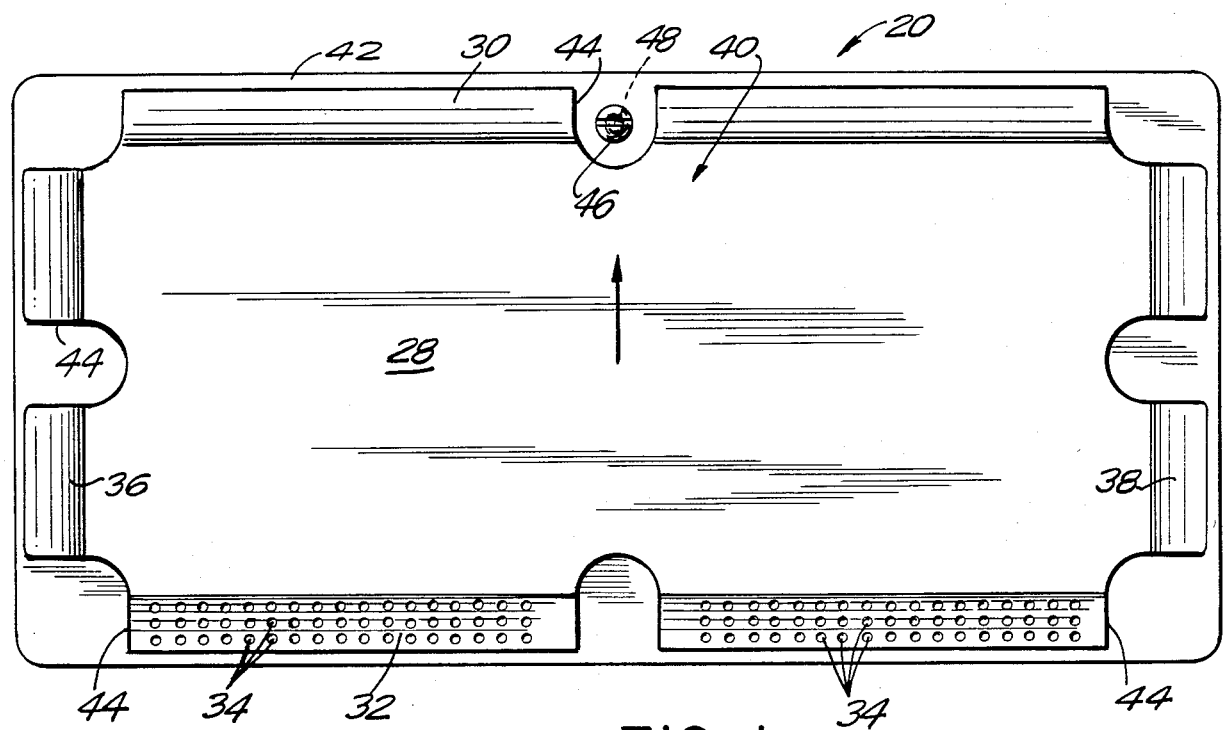
FIG. 1 is a front elevational view of a ventilator constructed in accordance with a first embodiment of the invention. The arrow thereon indicates the upward direction.
Figure 2:
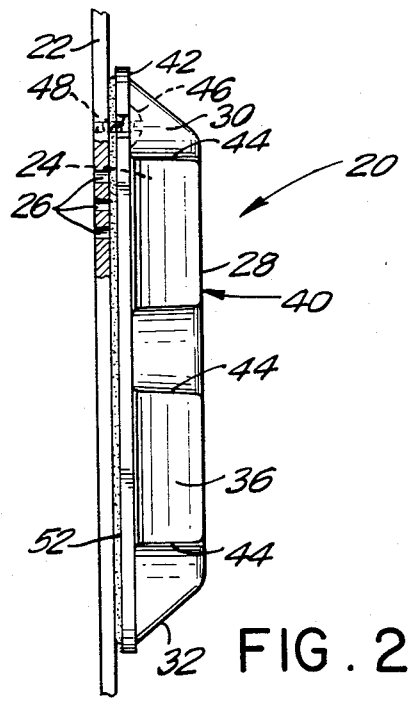
FIG. 2 is a left side elevational view of the ventilator of FIG. 1, the right side elevational view being a mirror image of FIG. 2.
Figure 3:
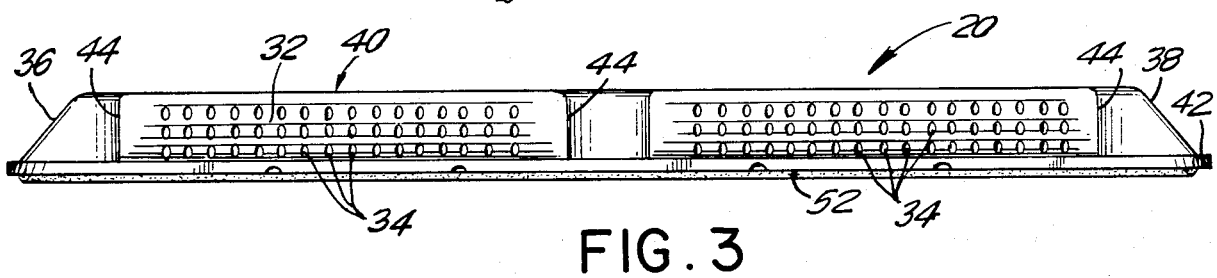
FIG. 3 is a bottom plan view of the ventilator of FIG. 1.
Figure 4:
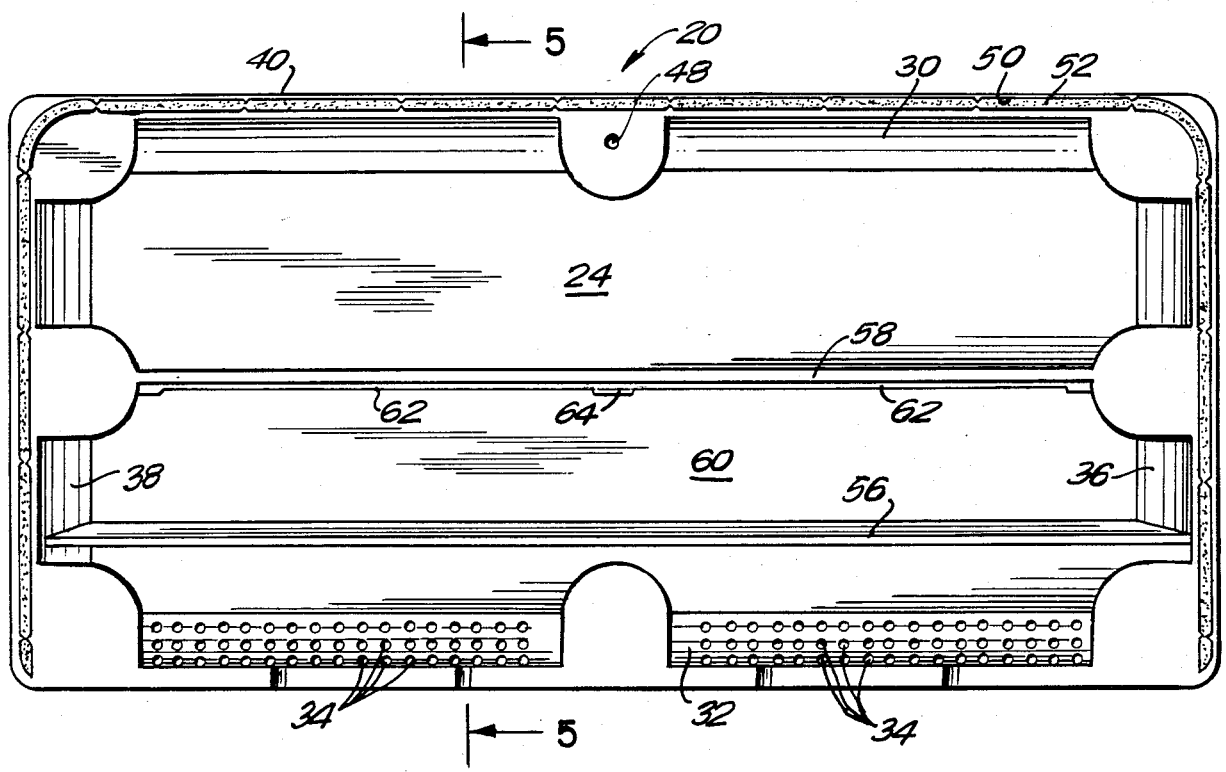
FIG. 4 is a rear elevational view of the ventilator of FIG. 1.
Figure 5:
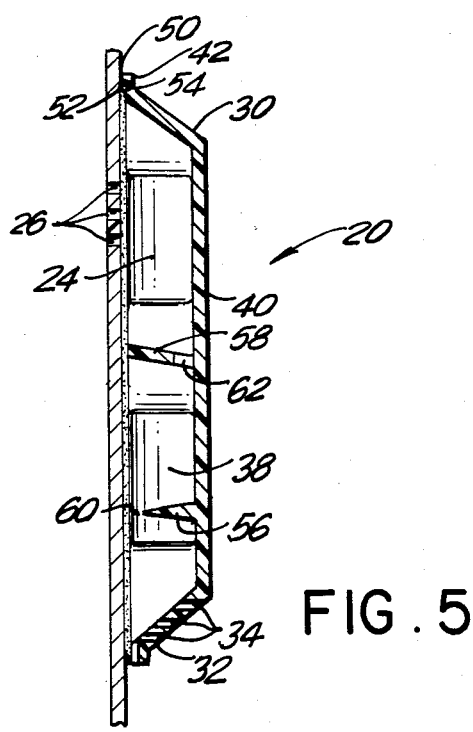
FIG. 5 is a sectional view of the ventilator taken along line 5-5 in FIG. 4.
Figure 6:
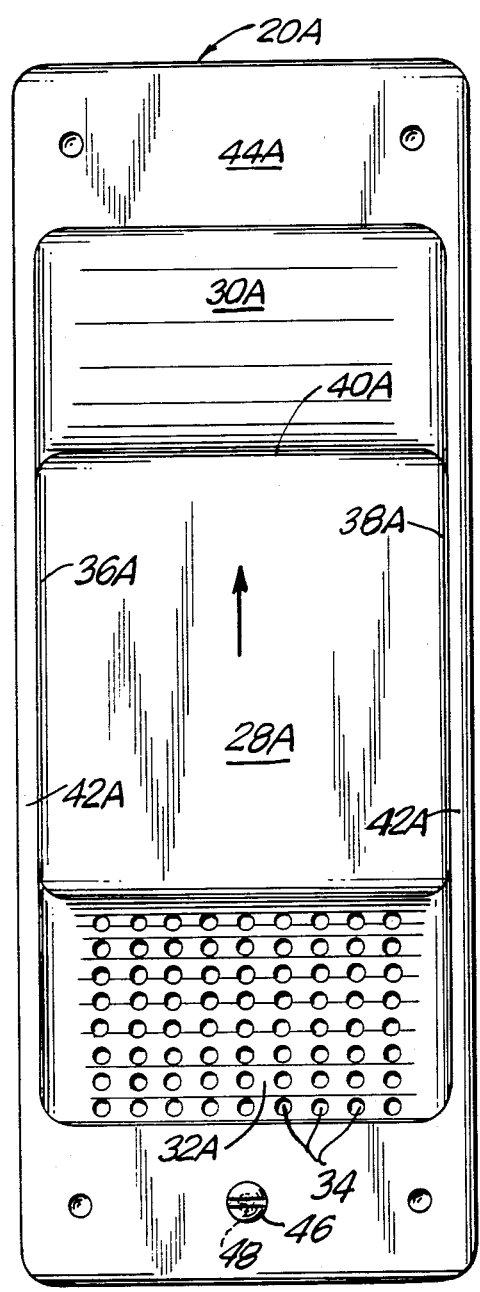
FIG. 6 is a front elevational view of a ventilator constructed in accordance with a second embnodiment of the invention. The arrow thereon indicates the upward direction.
Figure 7:
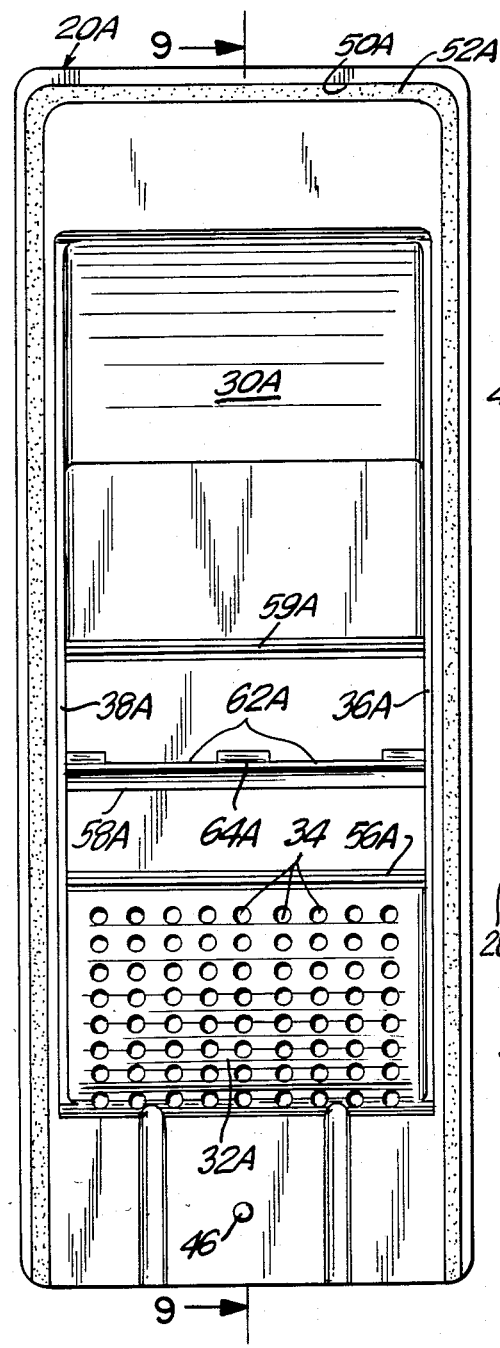
FIG. 7 is a rear elevational view of the ventilator of FIG. 6.
Figure 9:
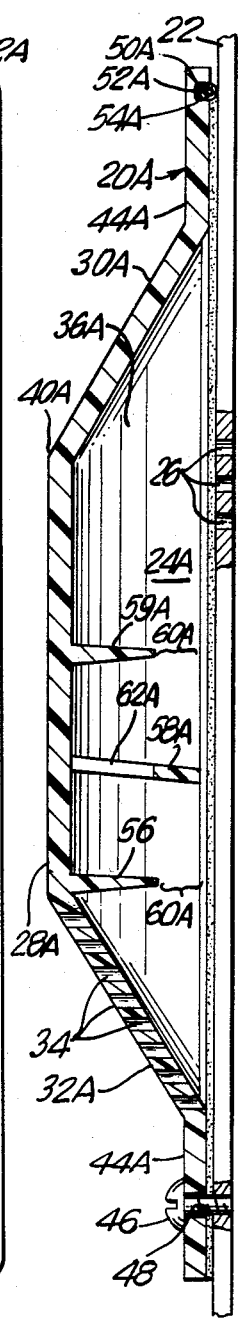
FIG. 9 is a sectional view of the ventilator of FIG. 6 taken along line 9—9 of FIG. 7.
Figure 8:
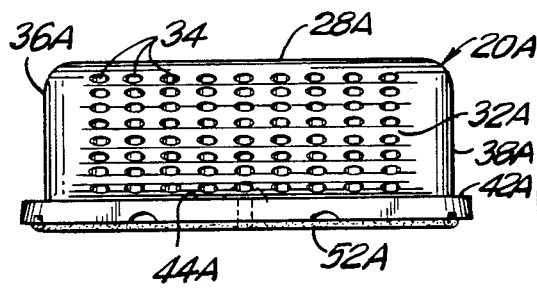
FIG. 8 is a bottom plan view of the ventilator of FIG. 6.

With reference to FIGS. 1-5, and more particularly to FIG. 2, there is shown a labyrinth ventilator generally designated 20 positioned on a container wall 22 with an upper chamber 24 of the ventilator 20 being contiguous to openings 26 in the wall 22. The openings 26 provide for circulation of air between the exterior and interior sides of the wall 22, the air passing via the upper chamber 24 to the opening 26.

The ventilator 20 comprises a front wall 28 and a top wall 30 which extends towards the rear of the ventilator 20 from a periphery of the front wall 28 and is inclined relative thereto. The sloping of the top wall 30 helps shed rain water. The ventilator further comprises a bottom wall 32 which joins with the front wall 28 and extends therefrom in an inclined manner towards the rear for contacting the container wall 22, the bottom wall 32 having apertures 34 for the passage of air into and out of the ventilator 20. Each aperture 34 has a circular cylindrical surface with the axis directed perpendicularly to the plane of the front wall 28. This orientation of the apertures 34 aids in directing rain away from the opening 26. The top and bottom walls 30 and 32 are joined by sidewalls 36 and 38 which also extend from the periphery of the front wall 28 rearwardly towards the container wall 22. The front wall 28 in co-operation with the top and bottom walls 30 and 32 and the side walls 36 and 38 constitute a housing 40 of the ventilator 20.

The housing 40 terminates in an encircling flange 42 located at the rear edges of the top and bottom walls 30, 32 and the sidewalls 36, 38. Fluted recesses 44 are disposed in the peripheral walls and extend to the flange 42 for enlarging portions thereof to facilitate securing of the ventilator 20 to the container wall 22. For example, the securing may be accomplished by screws 46 which pass through apertures 48 in the base portions of the recesses 44 to engage the container wall 22.

In accordance with a feature of the invention, it in noted that the peripheral walls of the housing 40 and their orientation relative to the front wall 28 facilitate a molding operation. In addition, the form of each fluted recess 44 is also configured to facilitate a one-step molding operation.

A further feature of the invention is provided by a channel 50 which is formed with the back side of the flange 42 and extends along the back ends of the side walls 36-38 and the top wall 30. The channel 50 holds a gasket or seal 52 formed of a flexible tube having a protuberance 54 which sets within the channel 50 to secure the seal 52 to the flange 42. Upon tightening the housing 40 to the container wall 22 via the screws 46, the seal 52 deforms so as to mate with the surface of the container wall 22 and thereby exclude rain from the interior of the ventilator 20.

A sinuous path for the flow of air from the bottom wall 32 to the opening 26 is provided by a lower baffle 56 and an upper baffle 58 which are formed as vanes which extend between the sidewalls 36 and 38. See FIG. 5. The lower baffle 56 extends from the front wall 28 part way to the rear of the housing 40 so as to leave a space 60 through which air can flow between the end of the baffle 56 and the container wall 22. The baffle 58 extends to the rear edge of the housing 40 and has two openings 62 along the front edge of the baffle 58 through which air can pass along the front wall 28 past the baffle 58 into the upper chamber 24 of the ventilator 20. The two baffles are spaced apart sufficiently to allow the flow of air therebetween. Thereby, a sinuous path is provided for air flow wherein the air passes behind the baffle 56 and in front of the baffle 58, and then through the opening 26 to the interior side of the container wall 22. The barriers 56 and 58 may be oriented perpendicularly to the front wall 28 or may be inclined slightly from the perpendicular relationship as may be desired for attenuating any wind forces which may be present on the outside of the bottom wall 32 and which may force air through the apertures 34. Whether oriented perpendicularly or inclined to the perpendicular, the orientation of the barriers 56 and 58 facilitates the molding of the ventilator 20, including the housing 40 as well as the baffles 56 and 58, in a single molding operation. Preferably, the material utilized in the molding is rigid, lightweight, and impervious to moisture. For example, polymeric materials such as polyethylene, polyurethane, and the polyacrylics may be employed.

The foregoing structure of the ventilator 20 provides rigidity to the housing 40, and thereby insures long life in use with cargo containers. A peripheral wall provides rigidity to the front wall 28. And the barrier 56, which contacts the front wall 28 over te entire length of the barrier 56, serves to brace the front wall 28. Also the barrier 58 serves to brace the front wall 28 by virtue of a leg 64 extending from a midpoint of the barrier 58 to the front wall 28.

With reference to FIGS. 6-9, there is shown thereon the second embodiment of the labyrinth ventilator 20A which is constructed with the same components as the ventilator 20, but with a somewhat different shape. In addition, the ventilator 20A has a third baffle 59A, the other components of the ventilator 20A corresponding to those of the ventilator 20. Thus, the ventilator 20A is placed against the container wall 22 with an upper chamber 24A of the ventilator 20A being adjacent an opening 26 through which air communicates between the ventilator 20A and the interior side of the container wall 22.

The ventilator 20A includes a housing 40A which comprises a front wall 28A which is attached to a top wall 30A and a bottom wall 32A, the latter having apertures 34 for the passage of air into the ventilator 20A. Sidewalls 36A and 38A extend from the front wall and join the top and bottom walls 30A and 32A. A circumferential flange 42A joins the back ends of the peripheral walls 30A, 32A, 36A, and 38A, and includes a channel 50A on the back side of the flange 42A for receiving a seal 52A. The flange 42A is provided with extensions 44A on the top and bottom portions of the ventilator 28A, which extensions include apertures 48 through which 46 are inserted for securing the ventilator 20A to the container wall 22. The seal 52A has the same cross-section as the seal 52 and includes a protuberance 54A which sets within the channel 50A so as to seal out rain along the sides and the top of the junction of the ventilator 20A with the container wall 22.

The ventilator 20A also provides a sinuous path for the flow of air by means of a lower baffle 56A, an upper baffle 58A, and the third baffle 59A which is situated above the upper baffle 58A. All three baffles extend across the front wall 28A from the side wall 36A to the sidewall 38A. The lower baffle 56A and the third baffle 59A extend part way from the front wall 28A towards the rear edge of the housing 40A. The upper baffle 58A extends all the way to the rear edge of the housing 40A and includes openings 62A alongside the front wall 28A. The openings 62A are separated by a leg 64A which corresponds to the leg 64 of the ventilator 20. Air passes through spaces 60A located between the ends of the baffles 56A, 59A, and the container wall 22. The air also passes through the openings 62A between the front wall 28A and the upper baffle 58A.

The structure of the ventilator 20A differs from that of the ventilator 20 in that the sidewalls 36A and 38A of the ventilator 20A are disposed perpendicularly to the front wall 28A. In addition, the recesses 44 of the ventilator 20 are replaced with the extensions 44A in the ventilator 20A. The shape of the housing 40A and the baffles therein permit the facile fabrication of the ventilator 20A by molding as in the case of the ventilator 20. The materials which may be utilized in fabricating the ventilator 20A are the same as those disclosed for the ventilator 20.

Thereby, the foregoing description has provided for the construction of a ventilator which can be formed as a untiary structure which is readily secured and detached from a container wall without the necessity for providing the container wall with structural elements of the ventilator. The ventilator may be fabricated in a variety of sizes and shapes to accommodate an opening in the container wall through which air is to circulate.

It is to be understood that the above described embodiment of the invention is illustrative only, and that modifications thereof may occur to those skilled in the art. For example, the spacing between the baffles 56 and 58, and between the baffles 56A, 58A, and 59A, may be varied from that shown in the drawing, and additional baffles may be added as may be desired to shape the sinuous path. Accordingly, this invention is not to be regarded as limited to the embodiments disclosed herein, but is to be limited only as defined by the appended claims.

I claim:

1. A labyrinth ventilator to be placed upon the sidewall of a container at the site of at least one air breather opening in the sidewall, said ventilator being formed as a unitary structure comprising:
    a housing having a front wall and a perimetric wall extending from a periphery of said front wall towards an open rear portion of said housing, there being a set of air inlet apertures disposed in said perimetric wall and extending transversely along a bottom of said housing;
    a set of baffles including a lower baffle and an upper baffle extending transversely within said housing from one side of said housing to the opposite side of said housing, said lower baffle extending from said front wall part way toward said rear portion to provide a space for air flow between said lower baffle and said container sidewall upon emplacement of said ventilator on said container sidewall, said upper baffle having an air-flow opening at said front wall, said upper baffle extending to said rear portion to block a flow of air along said container sidewall, thereby to provide a sinuous path to airflow;
    means for securing said ventilator to said container sidewall; and wherein the extension of each of said baffles toward said open rear portion is in a direction sufficiently close to a normal to said front wall to permit said baffles and said housing to be formed integrally in a single molding operation.

2. A labyrinth ventilator according to claim 1 wherein each of said baffles is formed as a planar vein.

3. A labyrinth ventilator according to claim 2 wherein one of said baffles is oriented perpendicularly to said front wall, and a second of said baffles is inclined to said normal to said front wall.

4. A labyrinth ventilator according to claim 1 wherein said securing means includes a gasket disposed along a rear edge of said housing for sealihg a junction between said ventilator and said container sidewall upon emplacement of said ventilator on said container sidewall.

5. A labyrinth ventilator according to claim 4 wherein said perimetric wall terminates at the rear of said housing in a circumferential flange, said flange including a channel for reception of said gasket.

6. A labyrinth ventilator according to claim 5 wherein said perimetric wall comprises a top wall, a bottom wall, and opposed sidewalls joining said top wall and said bottom wall, said apertures are disposed in said bottom wall, said lower baffle and said upper baffle are each formed as veins, said lower baffle is inclined relative to a plane of said upper baffle, and wherein one of said baffles is perpendicular to said front wall.

7. A labyrinth ventilator according to claim 6 wherein said securing means further comprises fluted recesses located at the junction of said perimetric wall with said flange, said recesses providing access for fastening devices to fasten said ventilator to said container sidewall.

8. A labyrinth ventilator according to claim 6 wherein said securing means further comprises an extension of said flange, said extension providing access for fastening devices for fastening said ventilator to said container sidewall.

9. A labyrinth ventilator according to claim 6 further comprising a third baffle positioned above said upper baffle and extending part way between said front wall and the rear of said housing.

10. A labyrinth ventilator according to claim 6 wherein said gasket extends along the rear of said top wall and the rear of each of said side walls.

11. A labyrinth ventilator according to claim 6 wherein said bottom wall is inclined relative to said normal to said front wall, and said air inlet apertures are directed parallel to said normal.

* * * * *